US008249175B2

(12) United States Patent
Okamura

(10) Patent No.: US 8,249,175 B2
(45) Date of Patent: Aug. 21, 2012

(54) COMMUNICATION DEVICE, MULTI CARRIER TRANSMISSION SYSTEM, COMMUNICATION METHOD, AND RECORDING MEDIUM

(75) Inventor: Yusaku Okamura, Tokyo (JP)

(73) Assignee: NEC Magnus Communications, Ltd., Tokyo (JP)

( * ) Notice: Subject to any disclaimer, the term of this patent is extended or adjusted under 35 U.S.C. 154(b) by 1021 days.

(21) Appl. No.: 12/204,149

(22) Filed: Sep. 4, 2008

(65) Prior Publication Data

US 2009/0074085 A1    Mar. 19, 2009

(30) Foreign Application Priority Data

Sep. 14, 2007    (JP) ................... 2007-240034

(51) Int. Cl.
*H04B 3/00*    (2006.01)
(52) U.S. Cl. .................. 375/257; 375/227
(58) Field of Classification Search .............. 375/227, 375/257
See application file for complete search history.

(56) References Cited

U.S. PATENT DOCUMENTS

| | | | | |
|---|---|---|---|---|
| 6,782,246 | B1 * | 8/2004 | Kretschmer et al. | 455/226.3 |
| 2002/0048348 | A1 * | 4/2002 | Jin et al. | 379/29.01 |
| 2003/0123560 | A1 * | 7/2003 | Jacobsen et al. | 375/260 |
| 2003/0200084 | A1 * | 10/2003 | Kim et al. | 704/226 |

FOREIGN PATENT DOCUMENTS

| | | |
|---|---|---|
| JP | 2005534256 A | 11/2005 |
| JP | 2006165978 A | 6/2006 |
| JP | 2006203380 A | 8/2006 |
| WO | 2007074516 A | 7/2007 |

OTHER PUBLICATIONS

Korean Office Action for KR10-2008-90458 issued Feb. 9, 2010.
Itu-T, G.983.2 Amendment 2, Series G: Transmission Systems and Media. Digital Systems and Networks, Digital sections and digital line system—Optical line systems for local and access networks, ONT management and control interface specification for B-PON, Jan. 2007.
Japanese Office Action for JP2007-240034 issued Nov. 29, 2011.

\* cited by examiner

*Primary Examiner* — Shuwang Liu
*Assistant Examiner* — Michael Neff

(57) ABSTRACT

The present invention provides a communication device that may suppress unnecessary break points. A communication device 200 includes a noise measuring unit 205 that measures noise occurring on a communication line 300; a communication controlling unit 202 that adjusts an SNR value of a transmission signal based on the noise measured in the noise measuring unit 205 and carries out a communication; a virtual noise determining unit 206 that determines the amount of virtual noise applied to some noise and stores the determined amount of noise in a memory unit 204; and a virtual noise applying unit 207 that applies the amount of noise stored in the memory unit 204 to the noise, wherein the virtual noise determining unit 206 dynamically divides a frequency band and determines the amount of noise of the divided frequency band as the amount of virtual noise.

14 Claims, 13 Drawing Sheets

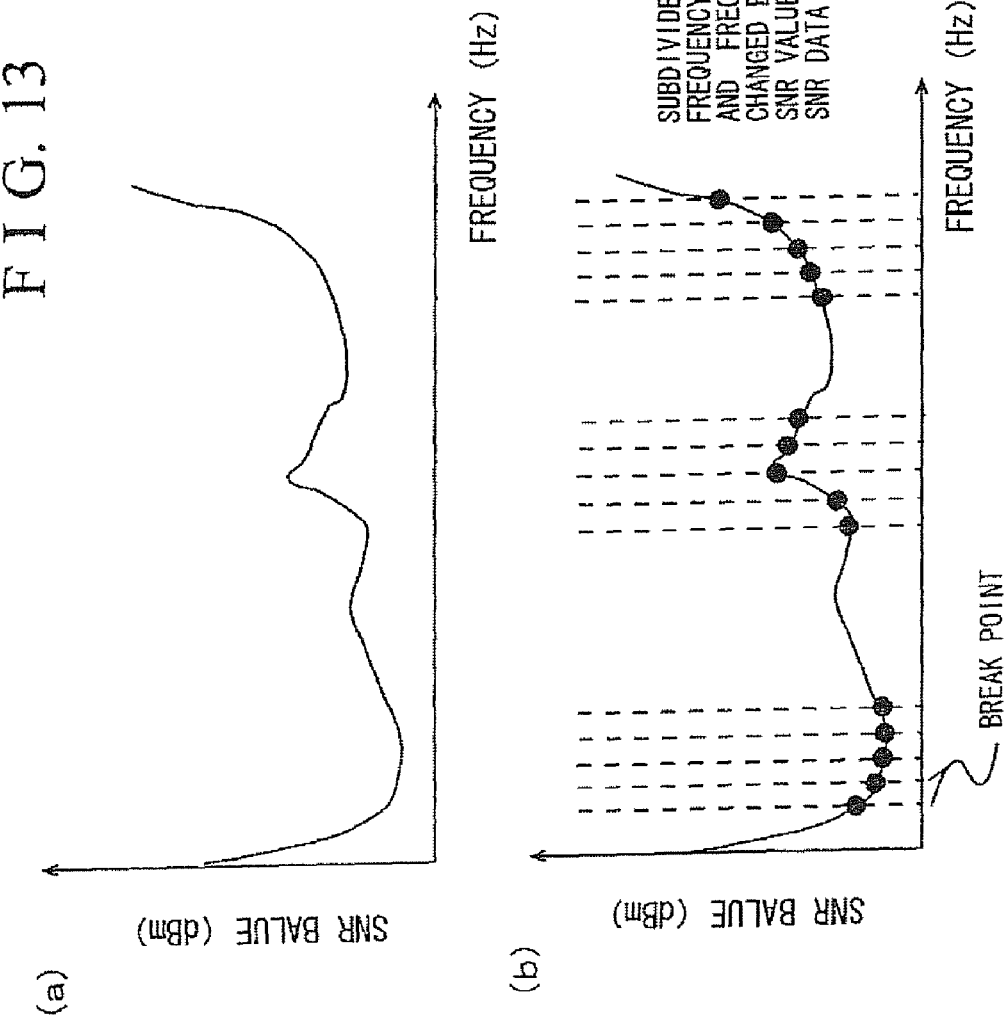

COMMUNICATION DEVICE, MULTI CARRIER TRANSMISSION SYSTEM, COMMUNICATION METHOD, AND RECORDING MEDIUM

This application is based upon and claims the benefit of priority from Japanese patent application No. 2007-240034, filed on Sep. 14, 2007, the disclosure of which is incorporated herein in its entirety by reference.

BACKGROUND OF THE INVENTION

1. Technical Field

The present invention is directed to a communication device, a multi carrier transmission system, a communication method, and a recording medium storing a communication program, which may be applicable to an xDSL (x Digital Subscriber Line) (where, x is the general term of A, S, and V) that enables high rate transmission of a few M bits/second through a metallic cable such as a telecommunication line.

2. Background Art

In recent years, xDSL technologies have been in the spotlight, which enable high rate transmission of a few M bits/second through a metallic cable such as a telecommunication cable. For example, xDSL includes ADSL (Asymmetric Digital Subscriber Line), SDSL (Symmetric Digital Subscriber Line), HDSL (High bit-rate Digital Subscriber Line), and VDSL (Very high bit-rate Digital Subscriber Line). These xDSL technologies may be differentiated depending on transmission speed, symmetry/asymmetry of speed, and the like. The above listed technologies are generally referred to as an "xDSL" technology.

An xDSL service is called "best effort type service", and a transmission speed of xDSL varies with an environment condition such as the transmission distance of a communication line or noise.

Generally, in an environment condition which has a short communication line and a small amount of noise, the transmission speed increases. On the contrary, in an environment which has a long transmission distance and a large amount of noise, the transmission speed decreases.

An xDSL service employees a DMT (Discrete Multi Tone) method as its modulation scheme.

The DMT method performs an initialization training process and measures the transmission distance of the communication line or SNR (Signal to Noise Ratio) of each carrier before a modem initiates a communication. And, based on the measured SNR of each carrier, the DMT method calculates a bit rate to be arranged to each carrier and determines a final transmission speed based on the calculated bit rate.

A system as shown in FIG. 1 may be taken as an example of a general multi carrier transmission system using an xDSL technology. Hereinafter, the general multi carrier transmission system will be described with reference to FIG. 1.

In a construction of the general multi carrier transmission system as shown in FIG. 1, an OLT (Optical Line Terminal) intra-station device 1 is connected to a VDSL home-side device 3 via a remote combined device 2. And, a VDSL station-side device 4 is connected to a VDSL home-side device 5 via a communication line 12. The remote combined device 2 includes an ONU (Optical Network Unit) and the VDSL station-side device. The ONU is connected to the OLT intra-station device 1 through a communication line 10. The VDSL station-side device 4 is connected to the VDSL home-side device 3 through a communication line 11.

Noise may be added into the communication line (12) in the multi carrier transmission system shown in FIG. 1, as shown in FIG. 2. An example of the noise may include crosstalk noise. Thus, each of units including the multi carrier transmission system includes a function that measures noise created on the communication line and adjusts an SNR value based on the measured noise.

The noise may be fluctuated over a long term period as shown in FIG. 3(a). Or, the noise may take place during transmission as shown in FIG. 3(b).

In such a case as shown in FIGS. 3(a) and 3(b), the adjusted SNR value suffers from lack of a margin value. As a consequence, a communication error or link freezing takes place, which may lead to deterioration in line quality. FIG. 3(a) depicts a case where noise has been measured for a long time. For example, this long-term noise measurement may give rise to a predetermined number of different results (for example, 100 different results) out of the total measurement results (for example, 400 results). FIG. 3(b) depicts a case where different measurement results, for example "the measurement results caused by an error or link freezing", take place out of the overall measurement results.

It has been suggested to apply virtual noise to known noise whose occurrence is anticipated to secure an SNR margin value for purpose of redundancy as shown in FIG. 4 in order to suppress the occurrence of communication errors or link freezing. FIG. 4 illustrates a case where virtual noise is added to some noise to yield noise used for calculation of bit allocation and an SNR margin value is secured for redundancy with respect to the noise used for calculation of bit allocation.

However, a high capacity memory is required to store the amount of noise (noise value) virtually applied over the overall carriers for the application of virtual noise as shown in FIG. 4. Accordingly, it is required to store the amount of noise for plural points (break points) as shown in FIG. 5.

FIG. 5 illustrates a case where each of plural break points is allocated to each of plural frequencies that are distributed at the same interval (for example, 1 MHz), respectively, in a one-to-one correspondence manner, wherein the amount of noise at the allocated break points is stored in a memory. That is, the amount of noise marked with "•" is stored in the memory as shown in FIG. 5.

However, if each of plural break points is allocated to each of plural frequencies that are distributed at the same interval (for example, 1 MHz), respectively, in a one-to-one correspondence manner, and the amount of noise at the whole break points is stored in the memory, the amount of noise may be stored in the memory even with respect to a frequency band that is not used for communication.

As a consequence, the case where the break points are allocated to the frequencies at the same interval as shown in FIG. 5 may give rise to a result of storing the unnecessary amount of noise in the memory. Accordingly, there is a need of suppressing unnecessary break points.

There is a patent application filed prior to the filing of this patent application, which discloses a technology of carrying out effective multi carrier transmission even in a case where some noise whose occurrence is not anticipated takes place (for example, refer to Japanese Patent Application Laid-Open (JP-A) No. 2006-165978).

Also, there is a document that discloses a technology of implementing stable communications in a noise pattern environment that is prone to cause unstable communications (for example, refer to Japanese Patent Application Laid-Open (JP-A) No. 2006-203380).

Furthermore, there is a document that discloses a technology of improving transmission efficiency in an ADSL (Asymmetric Digital Subscriber Line) network (for example, refer to Japanese Patent Application Publication (JP-A) No. 2005-534256).

JP-A No. 2006-165978 and JP-A No. 2006-203380 also disclose a technology of achieving stable communications. JP-A No. 2005-534256 also discloses allocating plural break points. However, no JP-A No. 2006-165978, JP-A No. 2006-203380 and JP-A No. 2005-534256 disclose suppressing unnecessary break points and its necessity.

SUMMARY

The present invention has been made in consideration of the above situations, and an object of the present invention is to provide a communication device, a multi carrier transmission system, a communication method and a recording medium storing a communication program that may suppress unnecessary break points.
<Communication Device>

According to an exemplary embodiment of the present invention, there is provided a communication device including: a measuring unit that measures noise occurring on a communication line; a communication control unit that adjusts an SNR value of a transmission signal based on the noise measured by the measuring unit and carries out a communication; a determination unit that determines an amount of virtual noise applied to the noise measured by the measuring unit and stores the measured amount of noise in a memory unit; and an applying unit that applies the amount of noise stored in the memory unit to the noise measured by the measuring unit, wherein the determination unit dynamically divides a frequency band and determines the amount of noise of the divided frequency band as the amount of virtual noise.
<Multi Carrier Transmission System>

According to an exemplary embodiment of the present invention, there is provided a multi carrier transmission system including a first communication device and a second communication device that are connected to each other through a communication line, wherein the communication device including: a measuring unit that measures noise occurring on a communication line; a communication control unit that adjusts an SNR value of a transmission signal based on the noise measured by the measuring unit and carries out a communication; a determination unit that determines an amount of virtual noise applied to the noise measured by the measuring unit and stores the determined amount of noise in a memory unit; and an applying unit that applies the amount of noise stored in the memory unit to the noise measured by the measuring unit, wherein the determination unit dynamically divides a frequency band and determines the amount of noise of the divided frequency band as the amount of virtual noise.
<Communication Method>

According to an exemplary embodiment of the present invention, there is provided a communication method including: a measuring step of measuring noise occurring on a communication line; a communication control step of adjusting an SNR value of a transmission signal based on the measured noise in the measuring step and carrying out a communication; a determination step of determining an amount of virtual noise applied to the noise measured in the measuring step and storing the determined amount of noise in a memory unit; and an applying step of applying the amount of noise stored in the memory unit to the noise measured by the measuring unit, wherein the determination step dynamically divides a frequency band and determines the amount of noise of the divided frequency band as the amount of virtual noise.
<Recording Medium Storing Communication Program>

According to an exemplary embodiment of the present invention, there is provided a recording medium storing a communication program, the recording medium performs in a computer a measuring process that measures noise occurring on a communication line; a communication control process that adjusts an SNR value of a transmission signal based on the noise measured in the measuring process and carries out a communication; a determination process that determines an amount of virtual noise applied to the noise measured in the measuring process and stores the determined amount of noise in a memory unit; and an applying process that applies the amount of noise stored in the memory unit to the noise measured by the measuring process, wherein the determination process dynamically divides a frequency band and determines the amount of noise of the divided frequency band as the amount of virtual noise.

BRIEF DESCRIPTION OF THE DRAWINGS

FIG. 13(a) is a view illustrating an example of a processing operation in xTU-C 100 or xTU-R 200 according to a second exemplary embodiment of the present invention, wherein a total measurement result is shown.

FIG. 13(b) is a view illustrating an example of a processing operation in xTU-C 100 or xTU-R 200 according to a second exemplary embodiment of the present invention, wherein virtual SNR data is shown.

EXEMPLARY EMBODIMENT

Figure 10:
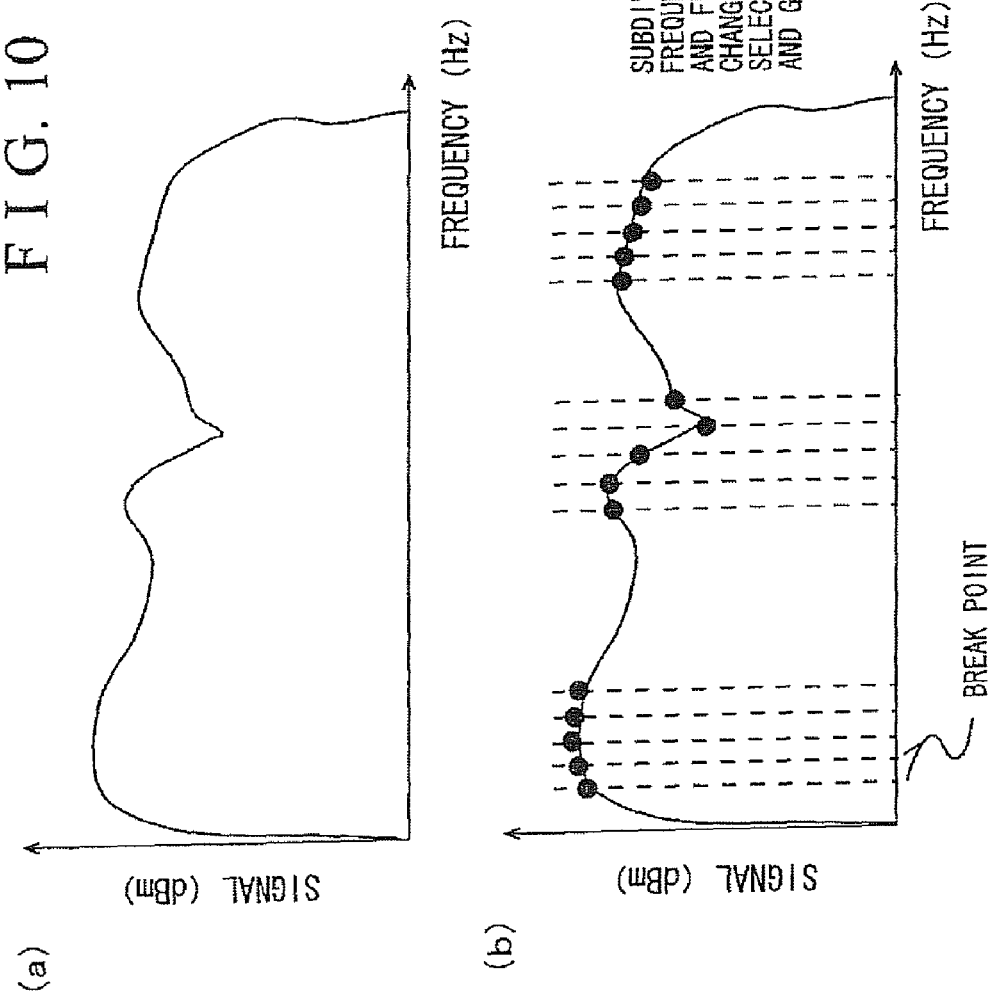
FIG. 10(a) is a view illustrating an example of a processing operation in xTU-C 100 or xTU-R 200 according to a first exemplary embodiment of the present invention, wherein a total measurement result is shown.
FIG. 10(b) is a view illustrating an example of a processing operation in xTU-C 100 or xTU-R 200 according to a first exemplary embodiment of the present invention, wherein virtual noise data is shown.

Summary of Multi Carrier Transmission System According to Exemplary Embodiments of the Present Invention Firstly, the summary of a multi carrier transmission system according to an exemplary embodiment of the present invention will be described with reference to FIG. 6, FIG. 7, and FIG. 10.

Figure 6:
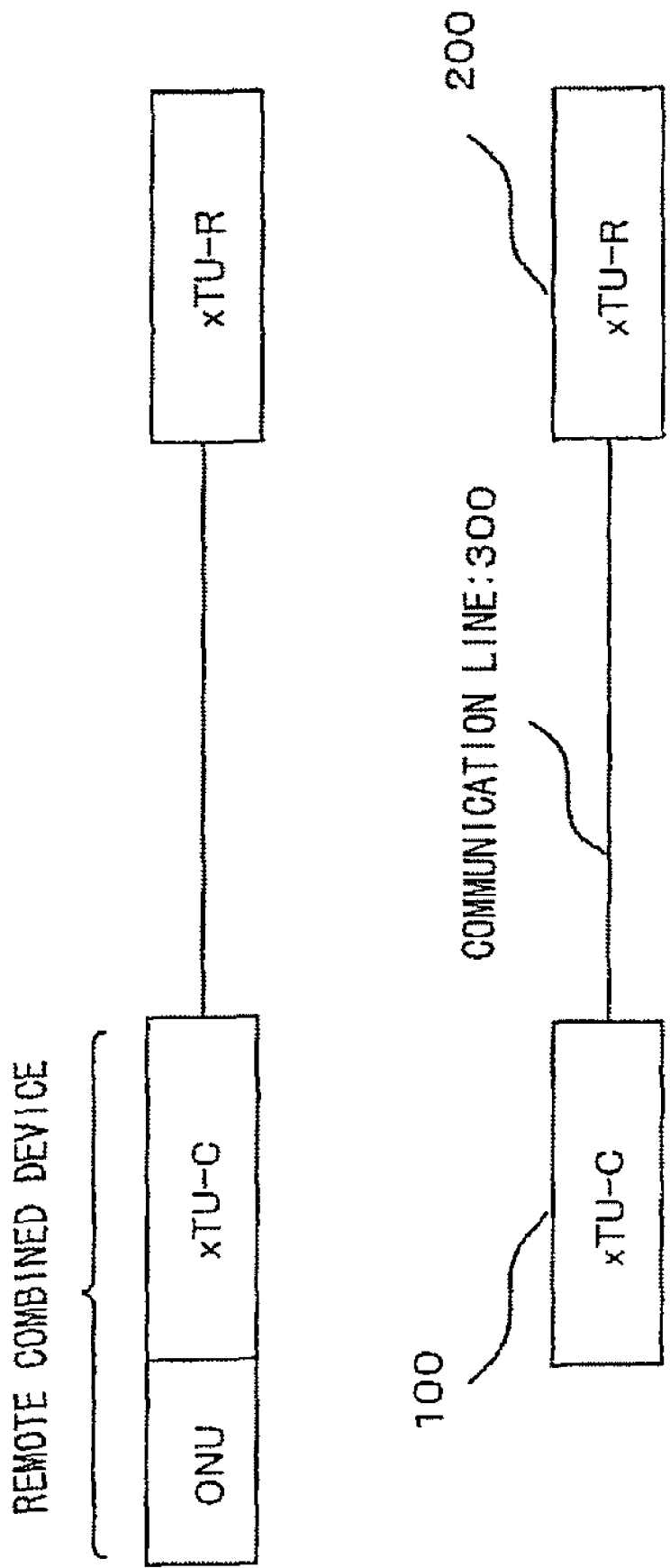
FIG. 6 is a view illustrating an example of a system construction of a multi carrier transmission system according to an exemplary embodiment of the present invention.

Referring to FIG. 6, the multi carrier transmission system according to the present embodiment includes a first communication device 100 (xTU-C; XDSL Termination Unit-Center side) and a second communication device 200 (xTU-R; XDSL Termination Unit-Remote side). The first communication device 100 and the second communication device 200 are connected to each other through a communication line 300.

Figure 7:
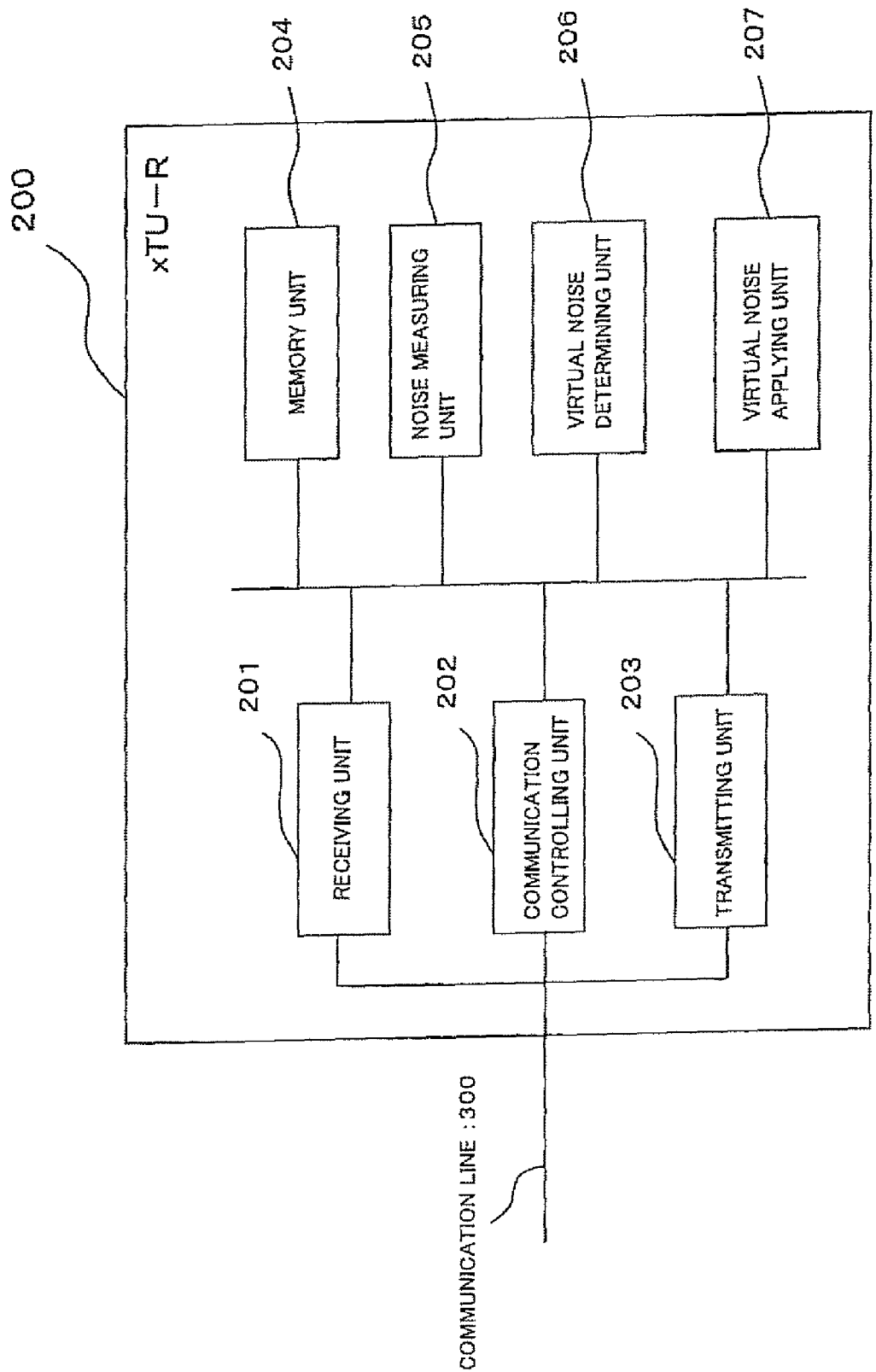
FIG. 7 is a block diagram illustrating an example of an inner construction of xTU-C 100 or xTU-R 200 which is a component of a multi carrier transmission system.

In this embodiment, each of the first communication device 100 and the second communication device 200 includes a noise measuring unit 205, a communication controlling unit 202, a virtual noise determining unit 206, and a virtual noise applying unit 207, as shown in FIG. 7. The noise measuring unit 205 measures noise created on the communication line 300. The communication controlling unit 202 adjusts an SNR value of a transmission signal based on the noise measured in the noise measuring unit 205 and performs a communication. The virtual noise determining unit 206 determines the amount of virtual noise which will be applied to the noise measured in the noise measuring unit 205 and stores the determined amount of virtual noise in a memory unit 204. The virtual noise applying unit 207 applies the amount of virtual noise stored in the memory unit 204 to the noise measured by the noise measuring unit 205.

In this embodiment, the virtual noise determining unit 206 dynamically divides a frequency band as shown in FIG. 10(b), and determines the amount of noise in the divided frequency band as the amount of virtual noise. For instance, the virtual noise determining unit 206 subdivides a first frequency band used for a communication, a second frequency band which exhibits a good line quality, and a third frequency band in which the noise amount is largely changed between two adjacent frequencies. And, the virtual noise determining unit 206 plots (selects) the amount of noise in the subdivided bands, and determines the selected amount of noise as the amount of virtual noise.

Figure 1:
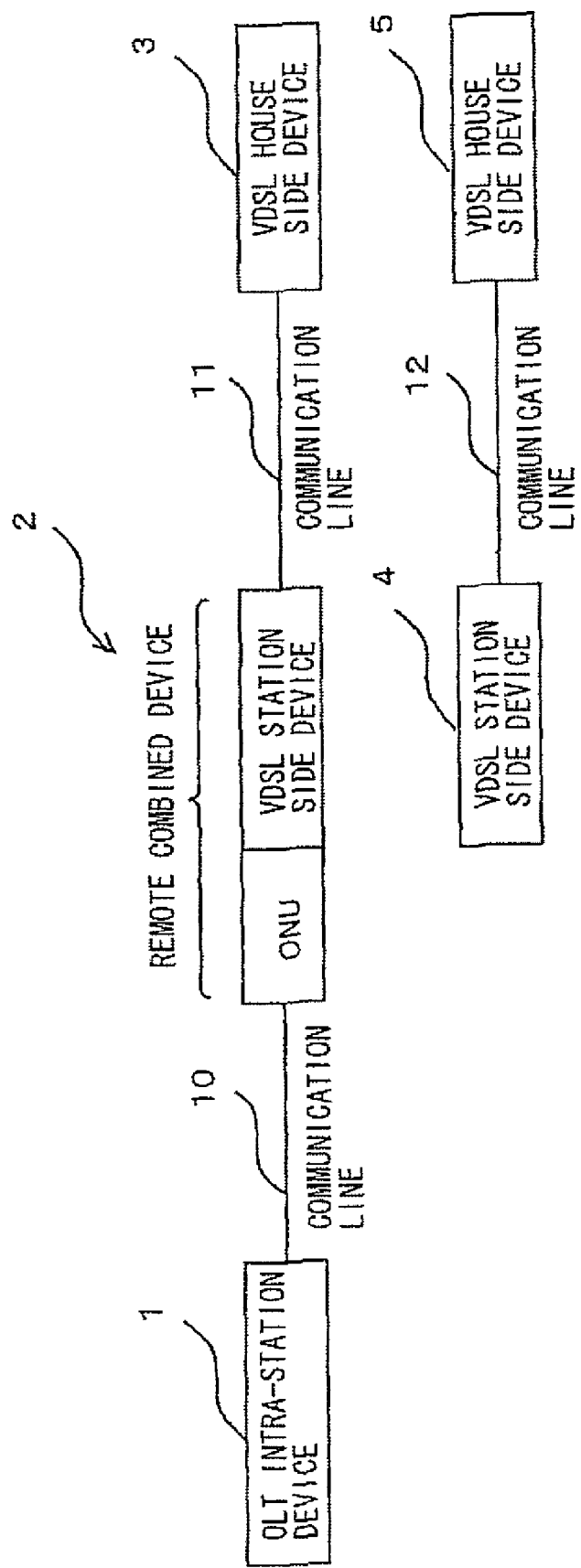
FIG. 1 is a view illustrating an example of a system construction of a general multi carrier transmission system according to the present invention.
Figure 2:
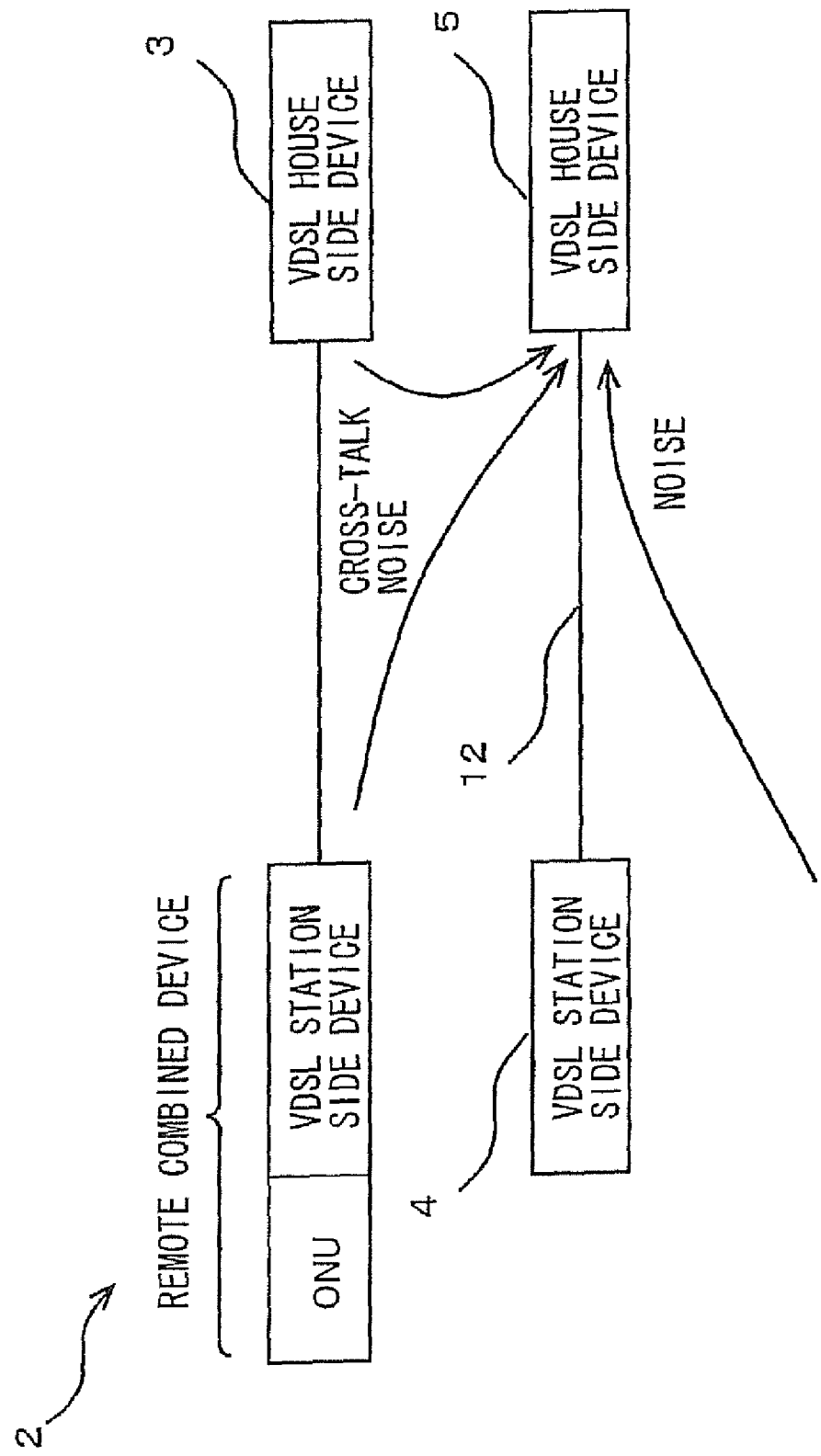
FIG. 2 is a view illustrating an example where noise is added to a communication line 12.
Figure 3:
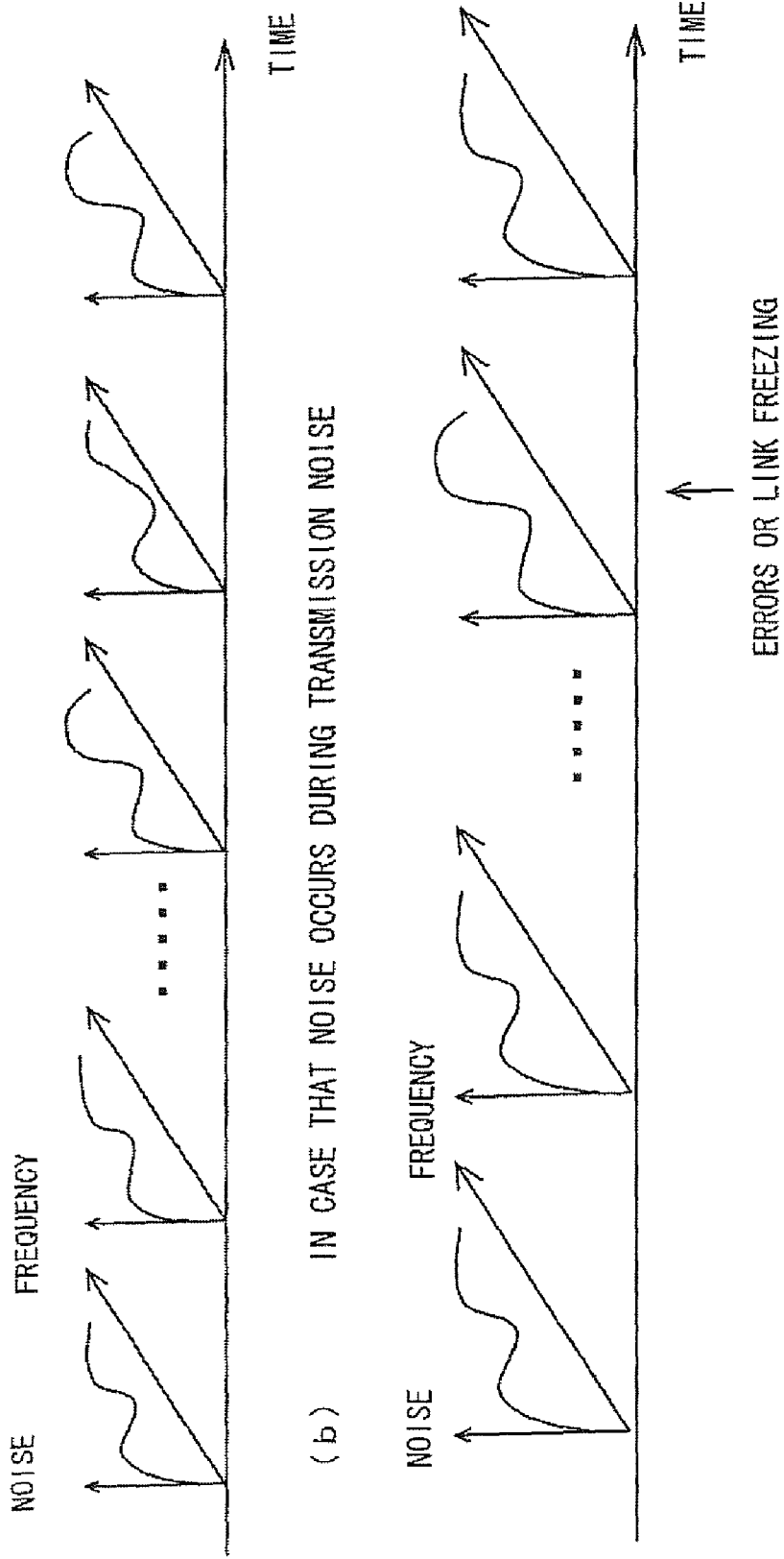
FIG. 3(a) is a view illustrating an example of noise that may cause communication errors or link freezing, wherein the noise fluctuates over a long term period.
FIG. 3(b) is a view illustrating an example of noise that may cause communication errors or link freezing, wherein the noise takes place during transmission.
Figure 4:
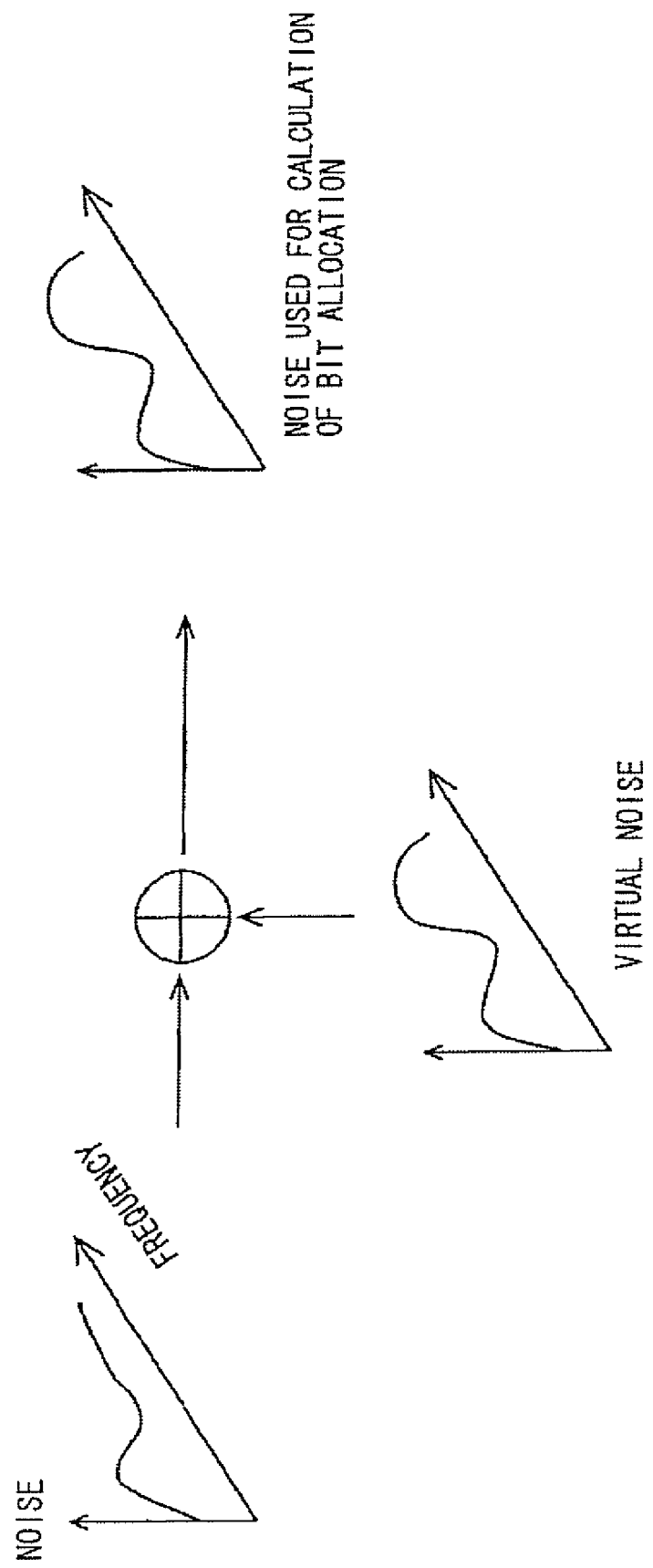
FIG. 4 is a view illustrating a method of applying virtual noise to some noise to secure an SNR margin value.
Figure 5:
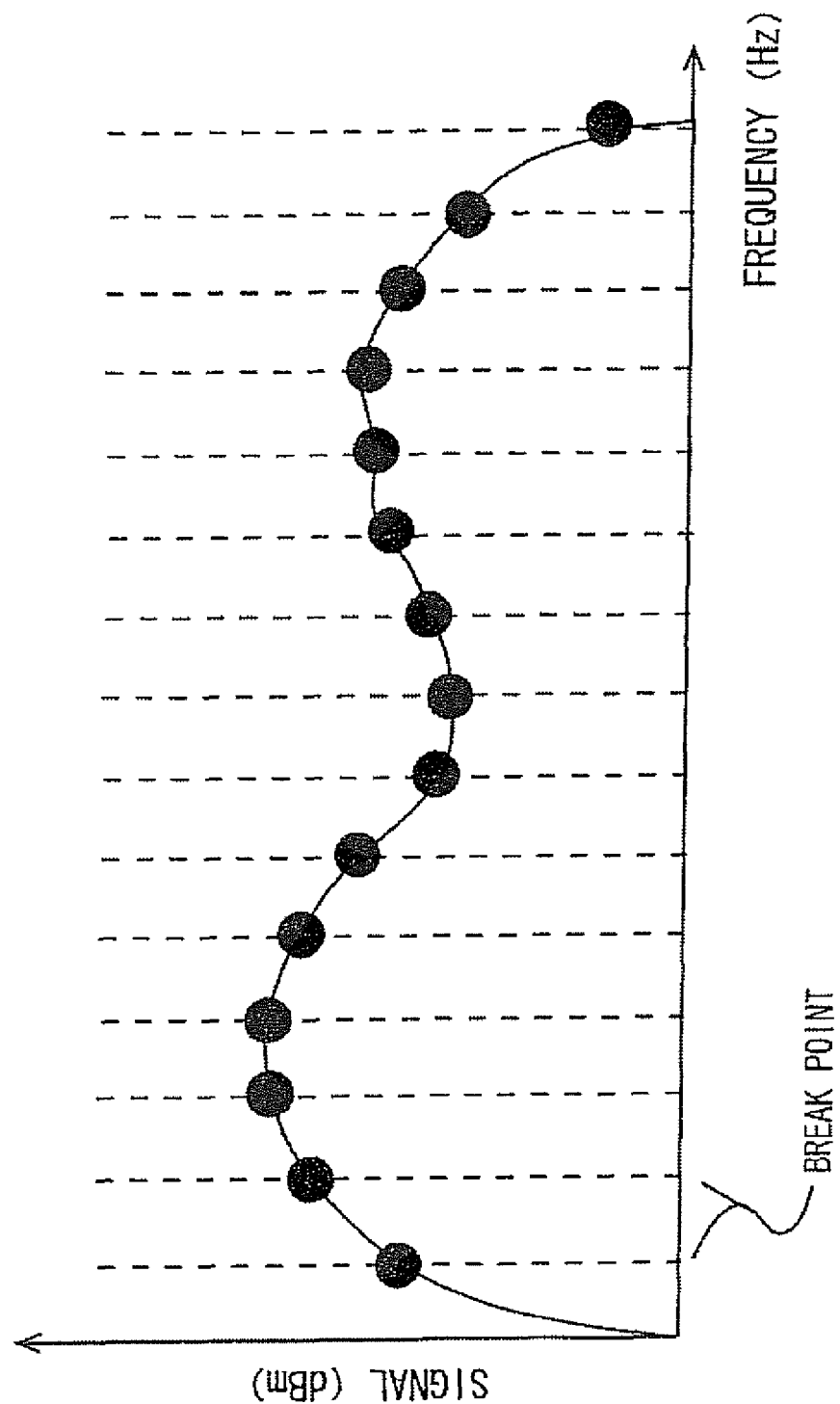
FIG. 5 is a view illustrating a case where each of plural break points is allocated to each of plural frequencies that are distributed at the same interval (for example, 1 MHz), respectively, in a one-to-one correspondence manner, wherein the amount of noise for the allocated break points is stored in a memory.

By doing so, the virtual noise determining unit 206 according to the present embodiment does not allocate the break points (points of determining the amount of virtual noise) to the frequencies at the same interval as shown in FIG. 5 to determine the amount of virtual noise, but dynamically divides the frequency band as shown in FIG. 10(b) to determine the amount of virtual noise. As a consequence, it is possible to suppress the unnecessary break points. Accordingly, it may be also possible to reduce the amount of memory for storing the amount of virtual noise in the memory unit 204.

In this embodiment, the virtual noise determining unit 206 also subdivides a first frequency band used for a communication, a second frequency band which exhibits a good line quality, and a third frequency band in which the noise amount is largely changed between two adjacent frequencies as shown in FIG. 10(b). And, the virtual noise determining unit 206 plots (selects) the amount of noise in the subdivided bands, and determines the selected amount of noise as the amount of virtual noise. By doing so, as the frequency band is divided finely, the finer amount of noise may be obtained correspondingly. As a result, the amount of noise to be applied as virtual noise may be precisely yielded, and therefore, the communication controlling unit 202 may adjust the SNR value with high precision. Accordingly, it may be possible to reduce securing unnecessary SNR margin values, thus leading to suppression of deterioration in speed. Hereinafter, an exemplary multi carrier transmission system according to exemplary embodiments will be described in more detail with reference to accompanying drawings.

First Exemplary Embodiment

<Systematic Construction of Multi Carrier Transmission System>

Firstly, a systematic construction of a multi carrier transmission system according to the first exemplary embodiment will be described with reference to FIG. 6.

As shown in FIG. 6, the multi carrier transmission system according to the first exemplary embodiment includes a station-side device 100, i.e. xTU-C (XDSL Termination Unit-Center side) and a home-side device 200, i.e. xTU-R (XDSL Termination Unit Remote side). The station-side device 100 and the home-side device 200 are connected to each other through a communication line 300.

<Inner Construction of xTU-C 100 and xTU-R 200>

Hereinafter, an inner construction of the xTU-C 100 and the xTU-R 200 will be described with reference to FIG. 7. The xTU-C 100 is almost identical to the xTU-R 200 in construction, and thus, the descriptions will be given based on the xTU-R 200.

The xTU-R 200 according to the first exemplary embodiment includes a receiving unit 201, a communication controlling unit 202, a transmitting unit 203, a memory unit 204, a noise measuring unit 205, a virtual noise determining unit 206, and a virtual noise applying unit 207.

The receiving unit 201 receives a signal transmitted from the xTU-C 100. The transmitting unit 203 transmits a signal to the xTU-C 100.

The communication controlling unit 202 controls a transmission signal that runs on the communication line 300. In this embodiment, the communication controlling unit 202 adjusts an SNR value of a transmission signal and controls the transmission signal based on noise measured in the noise measuring unit 205.

The memory unit 204 stores any information required to control a communication.

The noise measuring unit 205 measures noise created on the communication line 300.

The virtual noise determining unit 206 determines the amount of virtual noise that will be applied to the noise measured in the noise measuring unit 205. The amount of virtual noise determined in the virtual noise determining unit 206 is stored in the memory unit 204.

The virtual noise applying unit 207 applies the amount of virtual noise to the noise measured in the noise measuring unit 205 based on the amount of virtual noise stored in the memory unit 204.

<Process Operation in xTU-R 200>

Figure 8:
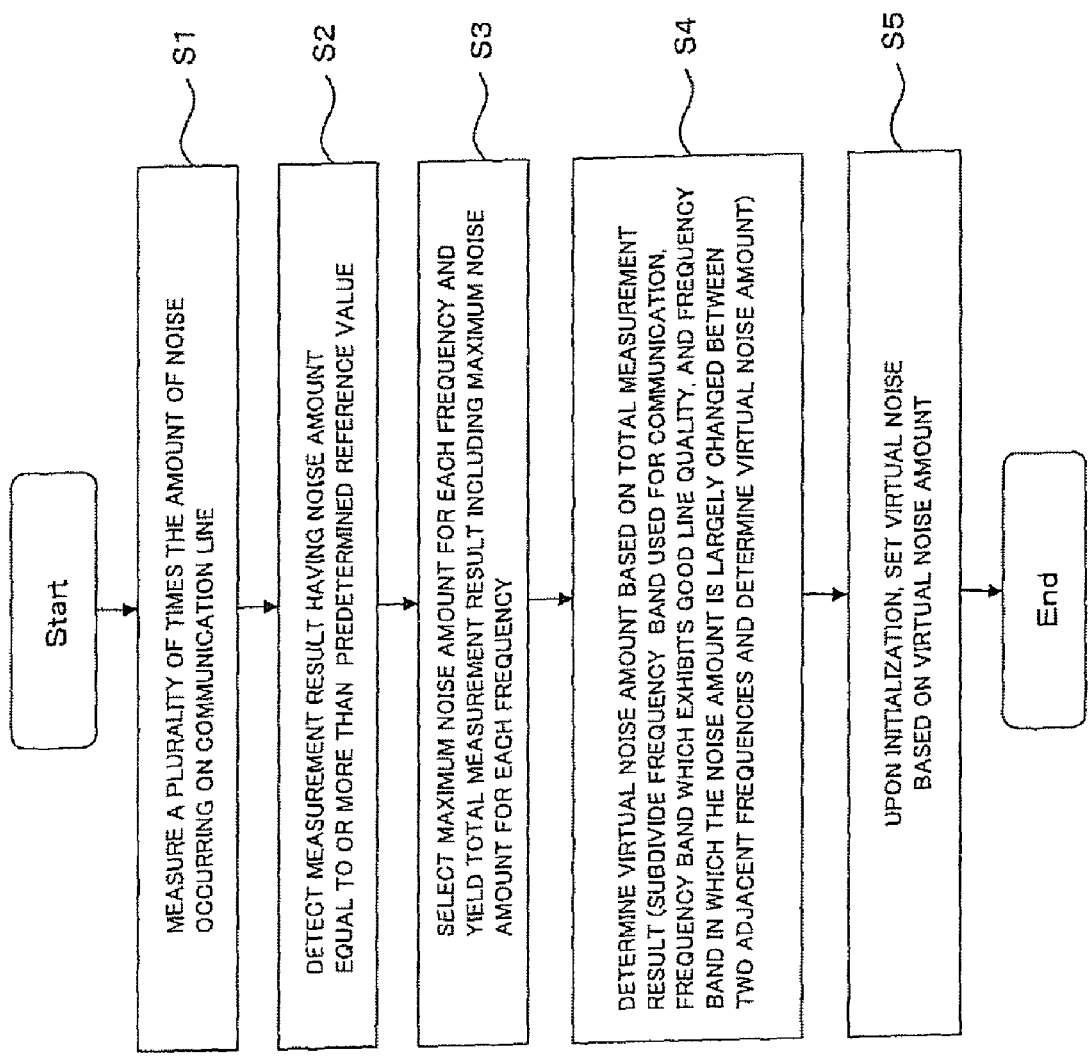
FIG. 8 is a flowchart illustrating an example of a processing operation in xTU-C 100 or xTU-R 200 according to a first exemplary embodiment of the present invention.
Figure 9:
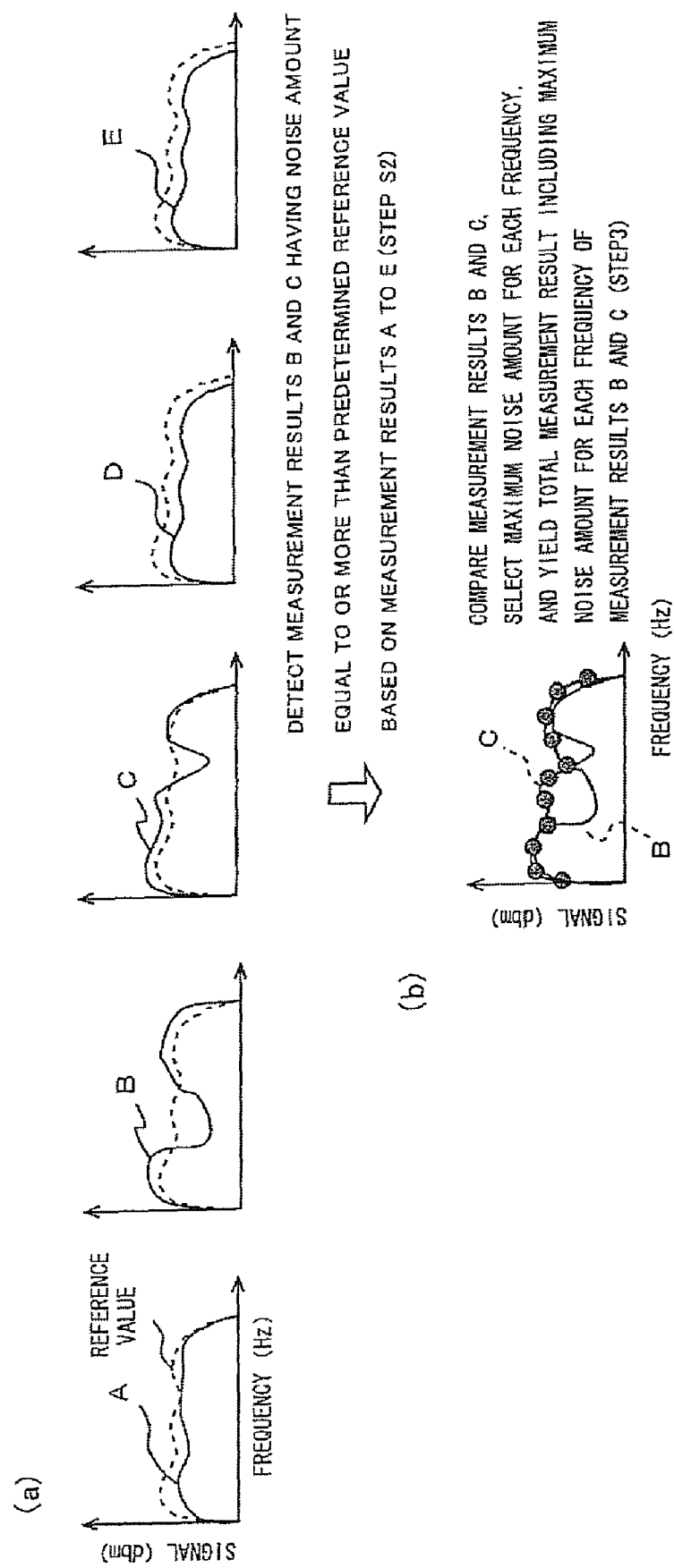
FIG. 9(a) is a view illustrating an example of a processing operation in xTU-C 100 or xTU-R 200 according to a first exemplary embodiment of the present invention, wherein five measurement results A to E are shown.
FIG. 9(b) is a view illustrating an example of a processing operation in xTU-C 100 or xTU-R 200 according to a first exemplary embodiment of the present invention, wherein a total measurement result is shown.

Hereinafter, process operations performed by the xTU-R 200 will be described with reference to FIGS. 8 to 10.

Firstly, the noise measuring unit 205 measures a plurality of times the amount of noise created on the communication line 300, and stores the measured results in the memory unit 204 (step S1). For example, the noise measuring unit 205 stores five measurement results A to E in the memory unit 204 as shown in FIG. 9(a).

Then, the virtual noise determining unit 206 detects the measurement result(s) that has/have the amount of noise (noise value) equal to or more than a predetermined reference value out of the five measurement results A to E stored in the memory unit 204 (step S2).

The measurement results B and C have the amount of noise equal to or more than the predetermined reference value as shown in FIG. 9(a), and thus, the virtual noise determining unit 206 detects the measurement results B and C that have the amount of noise equal to or more than the predetermined value out of the overall measurement results A to E shown in FIG. 9(a). By doing so, the virtual noise determining unit 206 may select only the measurement results B and C shown in FIG. 9(a) the amount of noise of which has been largely changed out of the plural measurement results stored in the memory unit 204.

Next, the virtual noise determining unit 206 compares the two measurement results B and C shown in FIG. 9(a) with each other, and selects the maximum amount of noise (maximum noise amount) for each and every frequency as shown in FIG. 9(b). By doing so, the virtual noise determining unit 206 yields a total measurement result as shown in FIG. 10(a), which includes the maximum noise amount of the measurement results B and C shown in FIG. 9(b), based on the maximum noise amount selected for each and every frequency (step S3).

Then, the virtual noise determining unit 206 determines the amount of virtual noise (virtual noise amount) based on the total measurement result shown in FIG. 10(a) (step S4). In this case, the virtual noise determining unit 206 dynamically divides the frequency band of the total measurement result shown in FIG. 10(a). Then, the virtual noise determining unit 206 plots (select) the amount of noise in the divided frequency band, and generates virtual noise data for applying the virtual noise as shown in FIG. 10(b). And, the virtual noise determining unit 206 stores the virtual noise data shown in FIG. 10(b) in the memory unit 204.

The virtual noise determining unit 206 subdivides a first frequency band used for a communication, a second frequency band which exhibits a good line quality, and a third frequency band in which the amount of noise is largely changed between two adjacent frequencies, as shown in FIG. 10(b). And, the virtual noise determining unit 206 plots (selects) the amount of noise in the subdivided bands, and generates virtual noise data.

Methods as below may be employed to subdivide the first frequency band used for a communication, the second frequency band which exhibits a good line quality, and the third frequency band in which the noise amount is largely changed between two adjacent frequencies.

For example, the first frequency band used for a communication, the second frequency band which exhibits a good line quality, and the third frequency band in which the amount of noise is largely changed between two adjacent frequencies, as well as the subdivided interval by which each frequency band is subdivided into a few frequencies are stored in the memory unit 204. By doing so, each of the first frequency band used for a communication, the second frequency band which exhibits a good line quality, and the third frequency band in which the noise amount is largely changed between two adjacent frequencies may be finely subdivided based on such information as stored in the memory unit 204.

And, information on the frequency band used by the xTU-R 200 in the past is managed in the memory unit 204. And then, a statistical process is carried out based on the information managed in the memory unit 204, and a frequency band in which the xTU-R 200 distributes more bit numbers than a predetermined value is divided to have a shorter band interval than a predetermined band interval. And, a frequency band in which xTU-R 200 distributes equal or less bit numbers to/than the predetermined value is divided to have a longer band interval than a predetermined band interval. By doing so, the frequency band used for a communication may be finely divided.

In this case, the frequency band may be divided into plural classes of sub bands based on a result of the statistical process, and the band interval by which the frequency band is divided may be changed into another band interval according to the divided classes of sub bands. For example, the frequency band may be divided into a sub band of A class, a sub band of B class, a sub band of C class, and a sub band of D class, wherein the sub band of A class distributes bit numbers in a range of between A and B (where, A>B); the sub band of B class distributes bit numbers in a range of between B and C (where, B>C); the sub band of C class distributes bit numbers in a range of between C and D (where, C>D); the sub band of class D distributes no bit numbers; and the like. And, the band interval by which the frequency band is divided is changed to another one according to the divided classes. As an example of a method of changing the band interval, the sub band of class A is set to have a band interval equal to a predetermined band interval multiplied by 25%, and the sub band of class D is set to have a band interval equal to a predetermined band interval multiplied by 200%. In addition, the frequency band may be also divided to have a plurality of classes considering the number of times of distribution of bit numbers as well as the bit numbers. By doing so, it may be possible to set the band interval for dynamically dividing the frequency band.

And, SNR value measured in the noise measuring unit 204 is yielded, and the frequency band with good line quality (for example, a frequency band having a higher SNR value than a predetermined threshold value) is specified based on the yielded SNR value. And, the specified frequency band with good line quality may be divided to have a shorter band interval than a predetermined band interval, and the frequency band with poor line quality (for example, a frequency band having a lower SNR value than a predetermined threshold value) may be divided to have a longer band interval than a predetermined band interval.

In this case, the frequency band may be divided into a plurality of classes based on the SNR value, and the band interval by which the frequency band is divided may be changed into another band interval according to the divided classes. For example, the frequency band may be divided into a sub band of A class, a sub band of B class, a sub band of C class, a sub band of D class, and a sub band of E class, wherein the sub band of A class has a higher SNR value than a predetermined threshold value by Δa; the sub band of B class has a higher SNR value than the predetermined threshold value by Δb (where, a>b); the sub band of C class has a SNR value almost identical to the predetermined threshold value; the sub band of D class has a less SNR value than the predetermined threshold value by Δb; the sub band of E class has a less SNR value than the predetermined threshold value by Δa; and the like. And, the band interval by which the frequency band is divided is changed to another one according to the divided classes. As an example of a method of changing the band interval, the sub band of class A is set to have a band interval equal to a predetermined band interval multiplied by 25%, and the sub band of class E is set to have a band interval equal to a predetermined band interval multiplied by 200%.

Next, the virtual noise applying unit 207 receives the virtual noise data shown in FIG. 10(b) from the memory unit 204 upon initialization, and sets virtual noise based on the received virtual noise data shown in FIG. 10(b). And, the virtual noise applying unit 207 applies the virtual noise to the noise measured in the noise measuring unit 205 based on the virtual noise data shown in FIG. 10(b).

By doing so, the communication controlling unit 202 adjusts the SNR value based on the measurement result acquired by applying the virtual noise to the noise measured in the noise measuring unit 205, and carries out a communication. As a result, the communication controlling unit 202 may secure an SNR margin value with respect to the frequency band to which the virtual noise has been applied. Accordingly, it may be possible to suppress the occurrence of communication errors or link freezing.

In addition, the virtual noise determining unit 206 dynamically divides the frequency band of the total measurement result shown in FIG. 10(a). And, the virtual noise determining unit 206 plots (selects) the amount of noise in the divided frequency band, generates the virtual noise data shown in FIG. 10(b) for applying the virtual noise, and stores the generated virtual noise data in the memory unit 204. By doing so, it may be possible to suppress a break point (point for determining the amount of virtual noise). As a consequence, the reduction in the memory amount of the virtual noise data stored in the memory unit 204 is achieved.

The virtual noise determining unit 206 subdivides a first frequency band used for a communication, a second frequency band which exhibits a good line quality, and a third frequency band in which the noise amount is largely changed between two adjacent frequencies as shown in FIG. 10(b). And, the virtual noise determining unit 206 plots (selects) the amount of noise in the subdivided bands, and generates virtual noise data. By doing so, the noise amount may be finely obtained. As a result, the amount of noise to be applied as a virtual noise may be precisely yielded, and therefore, the SNR margin value may be acquired with high precision. Accordingly, it may be possible to reduce securing unnecessary SNR margin values, thus leading to suppression of deterioration in speed.

Second Exemplary Embodiment

Hereinafter, a second exemplary embodiment of the present invention will be described.

In the multi carrier transmission system according to the first exemplary embodiment, the amount of noise created on the communication line 300 was measured a plurality of times. And, the measurement results were compared to each other, the maximum noise amount was selected for each and every frequency, and the total measurement result was obtained from the maximum noise amount for each frequency.

In the multi carrier transmission system according to the second exemplary embodiment, the SNR value is measured a plurality of times for the amount of noise created on the communication line 300. And, the measurement results are compared to each other, the minimum SNR value is selected for each and every frequency, and a total measurement result is obtained from the minimum SNR amount for each frequency.

Figure 11:
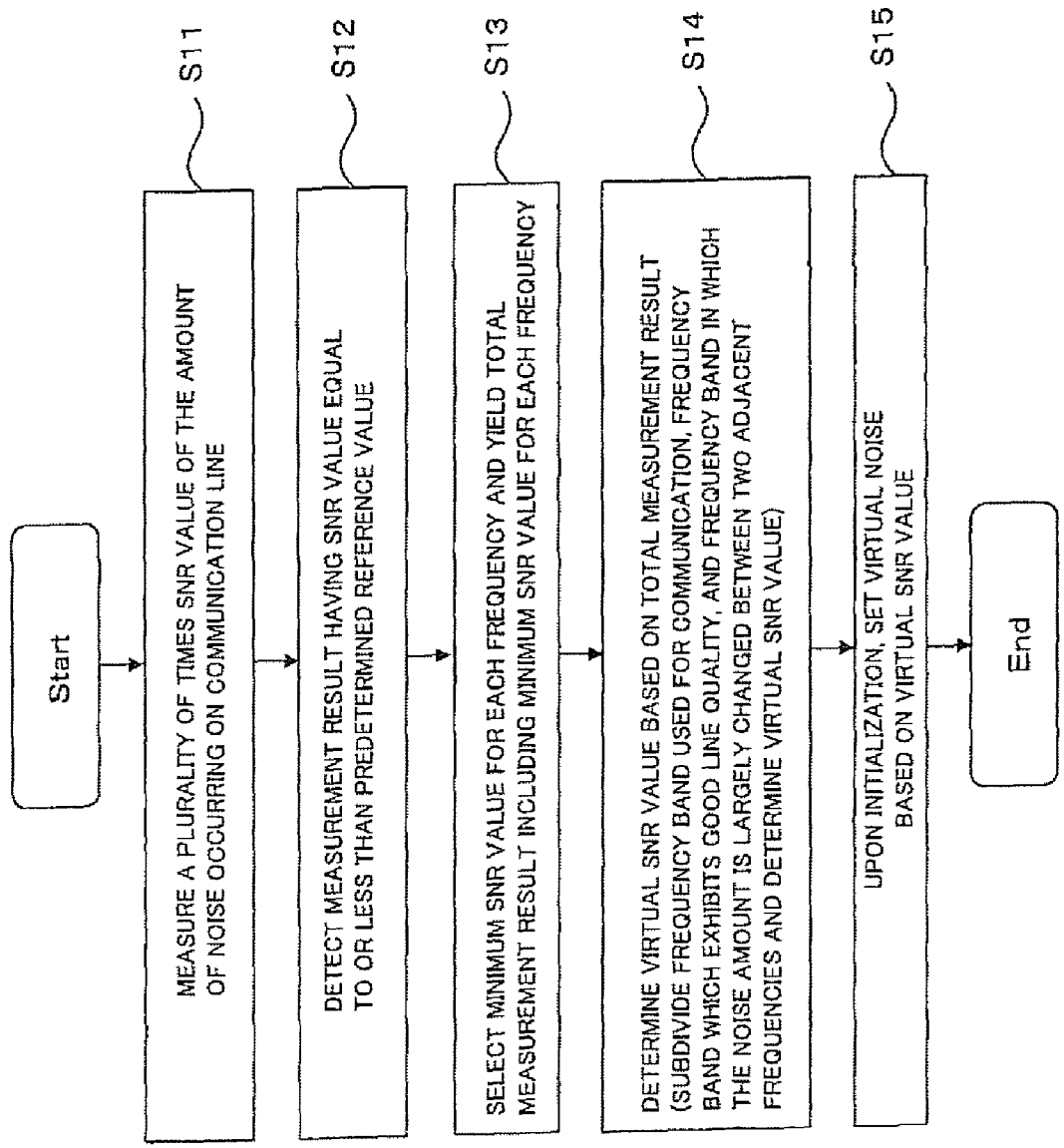
FIG. 11 is a flowchart illustrating an example of a processing operation in xTU-C 100 or xTU-R 200 according to a second exemplary embodiment of the present invention.
Figure 12:
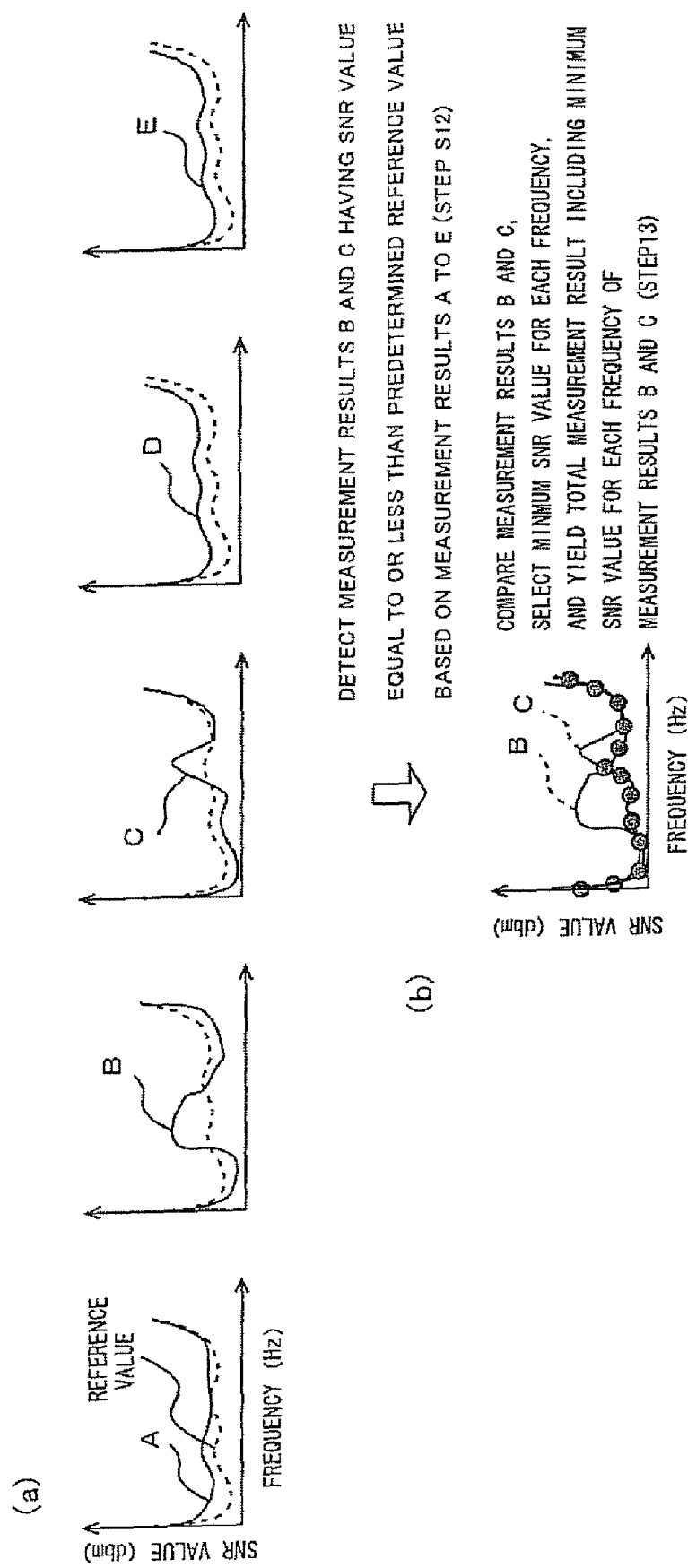
FIG. 12(a) is a view illustrating an example of a processing operation in xTU-C 100 or xTU-R 200 according to a second exemplary embodiment of the present invention, wherein five measurement results A to E are shown.
FIG. 12(b) is a view illustrating an example of a processing operation in xTU-C 100 or xTU-R 200 according to a second exemplary embodiment of the present invention, wherein a total measurement result is shown.

By doing so, it may be possible to apply virtual noise into the noise measured in the noise measuring unit 205 based on the SNR value as in the first exemplary embodiment. Hereinafter, the second exemplary embodiment will be described with reference to FIGS. 11 to 13. The multi carrier transmission system according to the second exemplary embodiment is configured as the multi carrier transmission system according to the first exemplary embodiment as shown in FIG. 6. However, the multi carrier transmission system according to the second exemplary embodiment is different from the multi carrier transmission system according to the first exemplary embodiment in processes performed by xTU-C 100 and xTU-R 200. Accordingly, process operations performed by the xTU-R 200 will be described as in the first exemplary embodiment.

Firstly, the noise measuring unit 205 measures a plurality of times an SNR value of the amount of noise created on the communication line 300, and stores the measured SNR value in the memory unit 204 (step S11).

The noise measuring unit 205 yields an SNR value of each carrier for every noise level using a transmission signal, such as a sync/symbol, and stores the yielded SNR value in the memory unit 204. By doing so, the noise measuring unit 205 yields an SNR value of each carrier, and stores the measurement results A to E in the memory unit 204 as shown in FIG. 12(a).

Then, the virtual noise determining unit 206 detects the measurement results that have an SNR value equal to or less than a predetermined reference value out of the five measurement results A to E shown in FIG. 12(a) stored in the memory unit 204 (step S12).

The measurement results B and C have the SNR value equal to or less than the predetermined reference value as shown in FIG. 12(a), and thus, the virtual noise determining unit 206 detects the measurement results B and C that have the amount of noise equal to or less than the predetermined value out of the overall measurement results A to E shown in FIG. 12(a). By doing so, the virtual noise determining unit 206 may select only the measurement results B and C shown in FIG. 12(a) the SNR value of which has been largely changed out of the plural measurement results stored in the memory unit 204.

Next, the virtual noise determining unit 206 compares the two measurement results B and C shown in FIG. 12(a) with each other, and selects the minimum value of the SNR (minimum SNR value) for each and every frequency as shown in FIG. 12(b). By doing so, the virtual noise determining unit 206 yields a total measurement result as shown in FIG. 13(a), which includes the minimum SNR value of the measurement results B and C shown in FIG. 12(b), based on the minimum SNR value selected for each and every frequency (step S13).

Then, the virtual noise determining unit 206 determines a virtual value of the SNR (virtual SNR value) based on the total measurement result shown in FIG. 13(a) (step S14). In this case, the virtual noise determining unit 206 dynamically divides the frequency band of the total measurement result shown in FIG. 13(a). Then, the virtual noise determining unit 206 plots (select) the SNR value in the divided frequency band, and generates virtual noise data as shown in FIG. 13(b) for applying the virtual noise. And, the virtual noise determining unit 206 stores the virtual SNR data shown in FIG. 13(b) in the memory unit 204.

The virtual noise determining unit 206 subdivides a first frequency band used for a communication, a second frequency band which exhibits a good line quality, and a third frequency band in which the noise amount is largely changed between two adjacent frequencies as shown in FIG. 13(b). And, the virtual noise determining unit 206 plots (selects) the SNR values in the subdivided bands, and generates virtual SNR data.

Next, the virtual noise applying unit 207 receives the virtual SNR data shown in FIG. 13(b) from the memory unit 204 upon initialization, and sets virtual noise based on the received virtual SNR data shown in FIG. 13(b). And, the virtual noise applying unit 207 applies the virtual noise to the noise measured in the noise measuring unit 205 based on the virtual SNR data shown in FIG. 13(b).

By doing so, the communication controlling unit 202 adjusts the SNR value based on the measurement result acquired by applying the virtual noise to the noise measured in the noise measuring unit 205, and carries out a communication. As a result, the communication controlling unit 202 may secure an SNR margin value with respect to the frequency band to which the virtual noise has been applied. Accordingly, it may be possible to suppress the occurrence of communication errors or link freezing.

In addition, the virtual noise determining unit 206 dynamically divides the frequency band of the total measurement result shown in FIG. 13(a). And, the virtual noise determining unit 206 plots (selects) the SNR value in the divided frequency band, generates the virtual SNR data shown in FIG. 13(b) for applying the virtual noise, and stores the generated virtual SNR data in the memory unit 204. By doing so, it may be possible to suppress break points (point for plotting the SNR value). As a consequence, the reduction in the memory amount of the virtual SNR data stored in the memory unit 204 is achieved.

The virtual noise determining unit 206 subdivides a first frequency band used for a communication, a second frequency band which exhibits a good line quality, and a third frequency band in which the noise amount is largely changed between two adjacent frequencies as shown in FIG. 13(b). And, the virtual noise determining unit 206 plots (selects) the SNR values in the subdivided bands, and generates virtual SNR data. By doing so, the SNR values may be finely obtained. As a result, the amount of noise to be applied as virtual noise may be precisely yielded, and therefore, the SNR margin values may be acquired with high precision. Accordingly, it may be possible to reduce securing unnecessary SNR margin values, thus leading to suppression of deterioration in speed.

The foregoing embodiments are preferred embodiments and are not to be construed as limiting scope of the present invention. The present teaching can be readily applied to other types of apparatuses without departing from the spirit and scope of the present invention. The description of the foregoing embodiments is intended to be illustrative, and not to limit the scope of the claims. Many modifications, alternatives and variations will be apparent to those skilled in the art.

For example, the control operations performed in each of the units including the multi carrier transmission system in the above embodiments may be implemented using either or both of hardware or/and software.

In a case where the control operations are implemented using software, a program storing a process sequence may be installed and executable in a memory in a computer provided with dedicated hardware. Alternatively, the program may be installed and executable in a general purpose computer that may carry out various processes.

For example, the program may be previously recorded in a hard disk or ROM (Read Only Memory) as a recording medium. Or, the program may be stored in a removable recording medium temporarily or permanently. The removable recording medium may be provided, what is called, as package software. The removable recording medium may include a CR-ROM (Compact Disc Read Only Memory), a MO (Magneto Optical) disc, a DVD (Digital Versatile Disc), a magnetic disc, and a semiconductor memory.

And, the program may be installed from the removable recording medium to a computer as described above. The program may be downloaded from a downloadable web site to the computer. The program may be transmitted to the computer over a network in a wired manner.

The multi carrier transmission system according to the embodiments may be configured not only to perform time-series processing according to the processing operations described in the above embodiments but also to perform parallel or individual processing depending on processing capability of a process executing device or as necessary.

In addition, the multi carrier transmission system according to the embodiments may be also configured as a logical combination of a plurality of devices or as a configuration so that each constitutional device is included in the same casing.

The present invention may be applicable to xDSL (x Digital Subscriber Line) (where, x is the general term of A, S, and V) that enables high data rate transmission of several M bits/second over a metallic cable such as telephone line. The present invention may be also applicable to a wireless communication that employs a transmission scheme such as OFDM (Orthogonal Frequency Division Multiplexing).

What is claimed is:

1. A communication device comprising:
   hardware;
   a measuring unit implemented at least by the hardware and that measures noise occurring on a communication line to yield a plurality of measurement results;
   a communication control unit implemented at least by the hardware and that adjusts an SNR (signal to noise ratio) value of a transmission signal based on the noise measured by the measuring unit and carries out a communication;
   a determination unit implemented at least by the hardware and that dynamically divides a frequency band and selects one or more of the measurement results of the divided frequency band to determine the selected one or more as an amount of virtual noise applied to the noise measured by the measuring unit and stores the determined amount of noise in a memory unit; and
   an applying unit implemented at least by the hardware and that applies the amount of noise stored in the memory unit to the noise measured by the measuring unit.

2. The communication device of claim 1, wherein the determination unit that sets a band interval by which the frequency band is dynamically divided.

3. The communication device of claim 2, wherein the setting determination unit sets the band interval differently according to a frequency band.

4. The communication device of claim 1,
wherein the determination unit compares the measurement results measured by the measuring unit, selects a maximum noise amount for each and every frequency, and yields a total measurement result obtained from the maximum noise amount for each and every frequency,
wherein the determination unit dynamically divides a frequency band of the total measurement result and determines the maximum noise amount of the divided frequency band as the amount of virtual noise.

5. The communication device of claim 1,
wherein the determination unit compares the measurement results measured by the measuring unit, selects a minimum SNR value for each and every frequency, and yields a total measurement result obtained from the minimum SNR value for each and every frequency,
wherein the measuring unit measures an SNR value of noise occurring on a communication line,
wherein the determination unit dynamically divides a frequency band of the total measurement result, specifies a minimum SNR value of the divided frequency band, and determines the noise amount corresponding to the specified minimum SNR value as the amount of virtual noise.

6. The communication device of claim 1, wherein the determination unit stores an SNR value corresponding to the amount of virtual noise in the memory unit,
and the applying unit applies the noise amount corresponding to the SNR value stored in the memory unit to the noise measured by the measuring unit.

7. A communication device comprising:
a measuring means for measuring noise occurring on a communication line to yield a plurality of measurement results;
a communication control means for adjusting an SNR (signal to noise ratio) value of a transmission signal based on the noise measured by the measuring means and carrying out a communication;
a determination means for dynamically dividing a frequency band and selecting one or more of the measurement results of the divided frequency band to determine the selected one or more as an amount of virtual noise determining an amount of virtual noise applied to the noise measured by the measuring means and storing the determined amount of noise in memory means; and
an applying means for applying the amount of noise stored in the memory means to the noise measured by the measuring means.

8. A multi carrier transmission system including a first communication device and a second communication device connected to the first communication device through a communication line,
wherein the first and second communication device comprises:
a measuring unit that measures noise occurring on a communication line to yield a plurality of measurement results;
a communication control unit that adjusts an SNR (signal to noise ratio) value of a transmission signal based on the noise measured by the measuring unit and carries out a communication;
a determination unit that dynamically divides a frequency band and selects one or more of the measurement results of the divided frequency band to determine the selected one or more an amount of virtual noise applied to the noise measured by the measuring unit and stores the determined amount of noise in a memory unit; and
an applying unit that applies the amount of noise stored in the memory unit to the noise measured by the measuring unit.

9. The multi carrier transmission system of claim 8,
wherein the determination unit stores an SNR value corresponding to the amount of virtual noise in the memory unit, and
the applying unit applies the noise amount corresponding to the SNR value stored in the memory unit to the noise measured by the measuring unit.

10. A multi carrier transmission system including a first communication device and a second communication device connected to the first communication device through a communication line,
wherein the first and second communication device comprises:
a measuring means for measuring noise occurring on a communication line to yield a plurality of measurement results;
a communication control means for adjusting an SNR (signal to noise ratio) value of a transmission signal based on the noise measured by the measuring means and carrying out a communication;
a determination means for dynamically dividing a frequency band and selecting one or more of the measurement results of the divided frequency band to determine the selected one or more as an amount of virtual noise applied to the noise measured by the measuring means and storing the determined amount of noise in memory means; and
an applying means for applying the amount of noise stored in the memory means to the noise measured by the measuring means.

11. A communication method comprising:
a measuring step of measuring noise occurring on a communication line to yield a plurality of measurement results;
a communication control step of adjusting an SNR (signal to noise ratio) value of a transmission signal based on the measured noise in the measuring step and carrying out a communication;
a determination step of dynamically selecting one or more of the measurement results of the divided frequency band to determine the selected one or more as an amount of virtual noise applied to the noise measured in the measuring step and storing the determined amount of noise in a memory unit; and
an applying step of applying the amount of noise stored in the memory unit to the noise measured by the measuring step.

12. The communication method of claim 11,
wherein the determination step stores an SNR value corresponding to the amount of virtual noise in the memory unit, and
the applying step applies the noise amount corresponding to the SNR value stored in the memory unit to the noise measured by the measuring step.

13. A non-transitory recording medium storing a communication program to be executed by a computer, comprising:
a measuring process that measures noise occurring on a communication line to yield a plurality of measurement results;
a communication control process that adjusts an SNR (signal to noise ratio) value of a transmission signal based on the noise measured in the measuring process and carries out a communication;

a determination process that dynamically divides a frequency band and selects one or more of the measurement results of the divided frequency band to determine the selected one or more as an amount of virtual noise applied to the noise measured in the measuring process and stores the determined amount of noise in a memory unit; and an applying process that applies the amount of noise stored in the memory unit to the noise measured by the measuring process.

14. The non-transitory recording medium storing the communication program of claim 13,
wherein the determination process stores an SNR value corresponding to the amount of virtual noise in the memory unit, and
the applying process applies the noise amount corresponding to the SNR value stored in the memory unit to the noise measured in the measuring process.

* * * * *